(12) United States Patent
Zhu

(10) Patent No.: US 9,007,681 B2
(45) Date of Patent: Apr. 14, 2015

(54) MULTI-CORE ERBIUM-DOPED FIBER AMPLIFIER

(71) Applicant: OFS Fitel, LLC, Norcross, GA (US)

(72) Inventor: Benyuan Zhu, Princeton, NJ (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 14/360,849

(22) PCT Filed: Dec. 13, 2012

(86) PCT No.: PCT/US2012/069470
§ 371 (c)(1),
(2) Date: May 27, 2014

(87) PCT Pub. No.: WO2013/090549
PCT Pub. Date: Jun. 20, 2013

(65) Prior Publication Data
US 2014/0307304 A1    Oct. 16, 2014

Related U.S. Application Data

(60) Provisional application No. 61/569,939, filed on Dec. 31, 2011.

(51) Int. Cl.
*G02B 6/02* (2006.01)
*H01S 3/067* (2006.01)
*H01S 3/094* (2006.01)
*H01S 3/16* (2006.01)

(52) U.S. Cl.
CPC ........ *H01S 3/06737* (2013.01); *G02B 6/02347* (2013.01); *G02B 6/02371* (2013.01); *G02B 6/02357* (2013.01); *G02B 6/02338* (2013.01); *G02B 6/02042* (2013.01); *H01S 3/06754* (2013.01); *H01S 3/094007* (2013.01); *H01S 3/094011* (2013.01); *H01S 3/094019* (2013.01); *H01S 3/09408* (2013.01); *H01S 3/1608* (2013.01); *H01S 3/1618* (2013.01)

(58) Field of Classification Search
CPC ........... G02B 6/02347; G02B 6/02371; G02B 6/02357; G02B 6/02338
See application file for complete search history.

(56) References Cited

U.S. PATENT DOCUMENTS

| | | | | | |
|---|---|---|---|---|---|
| 4,136,929 | A | * | 1/1979 | Suzaki | 385/30 |
| 4,712,075 | A | * | 12/1987 | Snitzer | 359/341.1 |
| 4,773,924 | A | * | 9/1988 | Berkey | 65/409 |
| 4,799,949 | A | * | 1/1989 | Keck et al. | 65/409 |
| 4,948,217 | A | * | 8/1990 | Keck et al. | 385/24 |
| 5,048,026 | A | * | 9/1991 | Shaw et al. | 372/6 |
| 5,339,372 | A | * | 8/1994 | Miller et al. | 385/29 |
| 5,471,553 | A | * | 11/1995 | Teshima | 385/125 |
| 5,566,196 | A | * | 10/1996 | Scifres | 372/6 |
| 5,748,820 | A | * | 5/1998 | Le Marer et al. | 385/76 |
| 5,867,305 | A | * | 2/1999 | Waarts et al. | 359/337.12 |

(Continued)

*Primary Examiner* — Ari M Diacou
(74) *Attorney, Agent, or Firm* — Sam Har, Esq.

(57) ABSTRACT

A double-clad (DC) multicore (MC) Erbium-doped fiber amplifier (EDFA) for dense-wavelength-division multiplexing (DWDM) is disclosed. The DC-MC-EDFA comprises a length of DC-MC Erbium-doped fiber (EDF) that is core-matched spliced to a MC tapered signal-pump fiber combiner (TFC). For some embodiments, the optical signals are coupled into the DC-MC-EDF by the MC-TFC, and the pump energy is also coupled into the DC-MC-EDF by the MC-TFC. For some embodiments, the optical signals are also transmitted out of the DC-MC-EDF through the MC-TFC.

20 Claims, 6 Drawing Sheets

(56) References Cited

U.S. PATENT DOCUMENTS

| | | | |
|---|---|---|---|
| 5,907,652 A * | 5/1999 | DiGiovanni et al. | 385/125 |
| 6,243,522 B1 * | 6/2001 | Allan et al. | 385/123 |
| 6,301,421 B1 * | 10/2001 | Wickham et al. | 385/126 |
| 6,334,017 B1 * | 12/2001 | West | 385/123 |
| 6,334,019 B1 * | 12/2001 | Birks et al. | 385/125 |
| 6,539,155 B1 * | 3/2003 | Broeng et al. | 385/125 |
| 6,567,164 B2 * | 5/2003 | Birk et al. | 356/317 |
| 6,661,957 B1 * | 12/2003 | Levenson et al. | 385/125 |
| 6,826,335 B1 * | 11/2004 | Grudinin et al. | 385/43 |
| 7,016,573 B2 * | 3/2006 | Dong et al. | 385/46 |
| 7,221,822 B2 * | 5/2007 | Grudinin et al. | 385/30 |
| 7,272,956 B1 * | 9/2007 | Anikitchev et al. | 65/409 |
| 7,327,920 B2 * | 2/2008 | Dong et al. | 385/115 |
| 7,340,140 B1 * | 3/2008 | Xu et al. | 385/125 |
| 7,492,993 B2 * | 2/2009 | Nakai et al. | 385/46 |
| 7,526,165 B2 * | 4/2009 | Nielsen et al. | 385/125 |
| 7,787,729 B2 * | 8/2010 | Dong et al. | 385/123 |
| 7,813,603 B2 * | 10/2010 | Nikolajsen | 385/39 |
| 8,213,077 B2 * | 7/2012 | Dong et al. | 359/341.1 |
| 8,693,088 B2 * | 4/2014 | Fini et al. | 359/334 |
| 2001/0028775 A1 * | 10/2001 | Hasegawa et al. | 385/127 |
| 2002/0131742 A1 * | 9/2002 | Bayart et al. | 385/125 |
| 2002/0146226 A1 * | 10/2002 | Davis et al. | 385/126 |
| 2002/0176677 A1 * | 11/2002 | Kumar et al. | 385/126 |
| 2003/0056550 A1 * | 3/2003 | Tanaka et al. | 65/428 |
| 2003/0059185 A1 * | 3/2003 | Russell et al. | 385/125 |
| 2003/0165313 A1 * | 9/2003 | Broeng et al. | 385/125 |
| 2003/0174986 A1 * | 9/2003 | Forbes et al. | 385/125 |
| 2004/0196537 A1 * | 10/2004 | Starodoumov | 359/341.3 |
| 2005/0105866 A1 * | 5/2005 | Grudinin et al. | 385/123 |
| 2005/0152655 A1 * | 7/2005 | Sunagawa | 385/125 |
| 2006/0010921 A1 * | 1/2006 | Mori et al. | 65/393 |
| 2006/0204190 A1 * | 9/2006 | Ranka | 385/123 |
| 2006/0263024 A1 * | 11/2006 | Dong et al. | 385/125 |
| 2007/0003196 A1 * | 1/2007 | Holcomb et al. | 385/115 |
| 2007/0280597 A1 * | 12/2007 | Nakai et al. | 385/43 |
| 2009/0046984 A1 * | 2/2009 | Mukasa | 385/125 |
| 2009/0154882 A1 * | 6/2009 | Salokatve | 385/50 |
| 2009/0201953 A1 * | 8/2009 | Peyghambarian et al. | 372/6 |
| 2010/0142894 A1 * | 6/2010 | Gonthier | 385/50 |
| 2010/0157418 A1 * | 6/2010 | Dong et al. | 359/341.3 |
| 2010/0278486 A1 * | 11/2010 | Holland et al. | 385/43 |
| 2011/0235165 A1 * | 9/2011 | Sugimoto et al. | 359/341.3 |
| 2012/0051692 A1 * | 3/2012 | Seo et al. | 385/28 |
| 2012/0087626 A1 * | 4/2012 | Nagashima et al. | 385/124 |
| 2012/0183304 A1 * | 7/2012 | Winzer et al. | 398/142 |
| 2012/0195554 A1 * | 8/2012 | Maack | 385/49 |
| 2013/0114129 A1 * | 5/2013 | Alkeskjold | 359/341.3 |
| 2013/0156393 A1 * | 6/2013 | Kokubun et al. | 385/126 |
| 2013/0216184 A1 * | 8/2013 | Kopp et al. | 385/43 |
| 2014/0036351 A1 * | 2/2014 | Fini et al. | 359/341.31 |

* cited by examiner

MULTI-CORE ERBIUM-DOPED FIBER AMPLIFIER

CROSS REFERENCE TO RELATED APPLICATIONS

This application claims the benefit of U.S. provisional patent application Ser. No. 61/569,939, filed 2011 Dec. 13, having the title "Double-Clad Pumped Multicore Er-Doped Fiber Amplifier and Method of Making Such," by Zhu, which is incorporated herein by reference in its entirety.

BACKGROUND

1. Field of the Disclosure

The present disclosure relates generally to optical fiber amplifiers and, more particularly, to systems and methods relating to multicore Erbium-doped optical fiber amplifiers.

2. Description of Related Art

As digital networks become ubiquitous, there are increasing demands for higher capacity in these networks. Demand for increased data capacity in optical networks has resulted in ongoing efforts to increase data capacity in these optical networks.

SUMMARY

Disclosed herein are several embodiments of fiber amplifier systems. In some embodiment, the fiber amplifier comprises a multicore (MC) tapered signal-pump fiber combiner (TFC) and gain-doped single-mode fibers, where each of the gain-doped single-mode fibers are core-match spliced to the MC-TFC. Other embodiments include fibers having gain-doped cores, which are surrounded by an inner cladding.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1A:
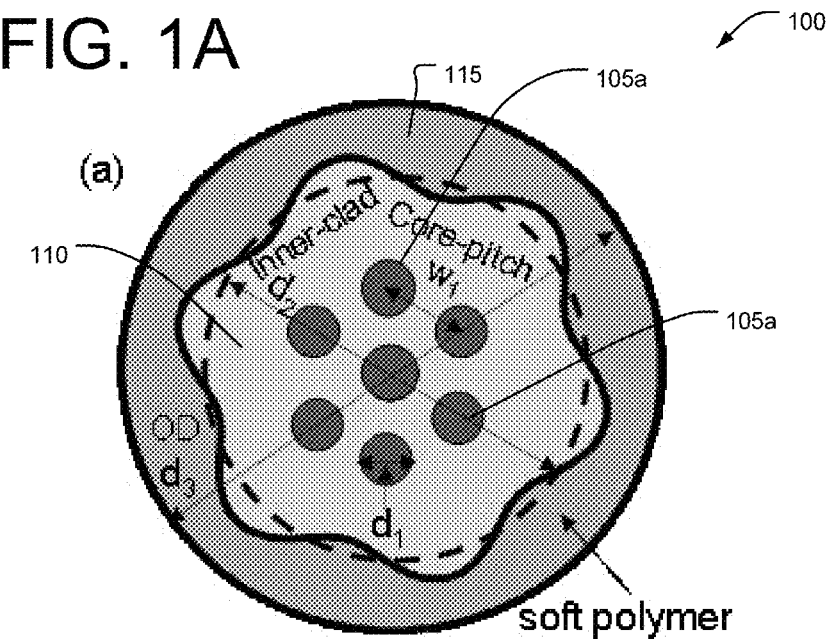
FIG. 1A is a diagram showing a cross-section of one embodiment of a double clad (DC) multicore (MC) Erbium-doped fiber (EDF).

As digital networks become ubiquitous, there are increasing demands for higher capacity in these networks. Space-division multiplexing (SDM) transmission using multicore (MC) fiber is a potential solution to meet these demands in optical networks. Such systems provide a high level of optical integration, so bandwidth can be scaled without requiring a similar scaling in the amount of optical hardware. MC optical amplifiers are, to some extent, becoming popular for SDM dense-wavelength-division multiplexing (DWDM) long-haul multi-span transmissions using multicore fibers (MCF). However, there are formidable technical challenges in designing and fabricating MCF optical amplifiers. These challenges arise because the cores in MCF are closely spaced, and amplification of signals in MC optical amplifiers requires that pump energy be combined with the signal light in each core efficiently such that optical signal gain can be generated in each core.

While the MC amplifiers using fan-in-out devices are known, those devices are less attractive and less cost-effective because they require separation of each core, and each core normally needs to be pumped separately by a respective individual pump source. Such a structure does not provide the integration that is the basic driver for spatially-multiplexed systems. Also, an additional fan-in-out device is often required to combine each individual signal back to each core in the MCF. As such, there is currently no reported MC optical amplifier for multi-span SDM-DWDM transmissions using MCF.

In order to provide an integrated multicore fiber amplifier (MCFA), certain design criteria should be considered. First is the desirability of a pump-signal multiplexer that can combine pump light with each signal core while providing for mode transformations, thereby allowing low-loss coupling between an amplifier input and the cores of the MC-EDF (which typically have smaller mode-field diameters (MFD) and are more-closely spaced). Another consideration is single-mode operation of the signals with broadband gain. Furthermore, designs frequently involve considerations of high achievable gain, high power-conversion efficiency, low noise, high saturated-output power, low cross-talk, short length of amplifier fiber, etc.

With all of these considerations in mind, one problem in designing a double-cladding-pumped (DC) multicore (MC) Erbium-doped fiber amplifier (EDFA) is low absorption of pump light, which correspondingly increases the fiber length. This is detrimental because of non-negligible background attenuation in the fibers as well as nonlinear effects which may become important at higher powers. Co-doping of Erbium (Er) with Ytterbium (Yb) and phosphorus (P) is usually used in DC-pumped amplifiers to increase the pump absorption. However, this P co-doping modifies the Er cross-section spectrum and negatively-affects amplification of wavelength-division-multiplexing (WDM) signals, especially at short wavelengths. For good gain flatness in WDM systems, it is often desirable to have low- or zero-concentration of P, requiring that the fiber be Yb-free with Al co-doping to get a broad gain spectrum of amplifications.

Since the pump absorption coefficient of a DC-fiber is inversely proportional to the ratio of the inner-cladding area to the core area, reducing the inner-cladding diameter would increase the pump absorption. However, smaller inner-cladding diameters require a smaller core-pitch, which can cause crosstalk among the cores in MC-EDF. Larger core diameters can allow for higher pump absorption coefficients, however, larger core diameters may lead to multimode operation or excessive bend loss, which are not desirable for telecom applications. High absorption cannot be increased arbitrarily by increasing the Er concentration due to effects such as pair induced quenching and or excited state absorption (ESA) using high pumps at 980 nm. As such, one having ordinary skill in the art will appreciate that designing a practical MC-EDFA for DWDM applications is neither trivial nor obvious in view of other multicore fiber designs. The various embodiments of the disclosed DC-MC-EDFA are designed with at least these competing interests in mind.

Several embodiments of the DC-MC-EDFA, which are described herein, comprise a length of DC-MC Erbium-doped fiber (EDF) with optical signal-gains generated in each core. In some embodiments, optical signals are coupled into the DC-MC-EDF by a MC tapered signal-pump fiber combiner (MC-TFC). The pump energy is also coupled into the MC-EDF via the MC-TFC. For some embodiments, the optical signals are also transmitted out of the DC-MC-EDF through a MC-TFC. The pump can be provided by a co-propagation scheme, a counter-propagation pumped scheme, or both co- and counter-propagation schemes. The DC-MC-EDFA is formed by core-to-core-matched splicing the DC-MC-EDF with the MC-TFC. In another embodiment, optical signals and pumps are combined by a side-pumping scheme.

Having generally described several embodiments of a DC-MC-EDFA, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Multicore (MC) Erbium-Doped Fiber (EDF)

FIG. 1A is a diagram showing a cross-section of one embodiment of a double-cladding-pumped (DC) multicore (MC) Erbium-doped fiber (EDF). In the embodiment of FIG. 1A, the DC-MC-EDF 100 comprises seven (7) rare-earth-doped cores 105a . . . 105g (collectively, 105). For this particular embodiment, the rare-earth-dopant is Erbium (Er). However, it should be appreciated that additional co-dopants, such as Aluminum (Al), Lanthanum (La), Germanium (Ge), Phosphorous (P), Fluorine (F), etc., or any combination of these co-dopants can be used. The Er-doped cores 105 are surrounded by a lower index inner cladding 110, and the inner cladding 110 is surrounded by an even lower-index outer-cladding 115 (e.g., a glass, soft polymer, or air, or other suitable material, etc.). The cores 105 have core diameter of d1, a pitch of w1, and a numerical aperture NA1 relative to the inner cladding, and the inner cladding 110 has diameter of d2 and a numerical aperture NA2 relative to the outer-cladding 115, for which the outer-cladding diameter is denoted as d3. The cores 105 may be identical or may differ to provide desirable optical attributes, such as dissimilar propagation constants to avoid optical cross-talk. In the embodiment of FIG. 1A, the DC-MC-EDF is a DC fiber with the cores 105 having high Erbium (Er) concentrations and/or other dopants.

Figure 1B:
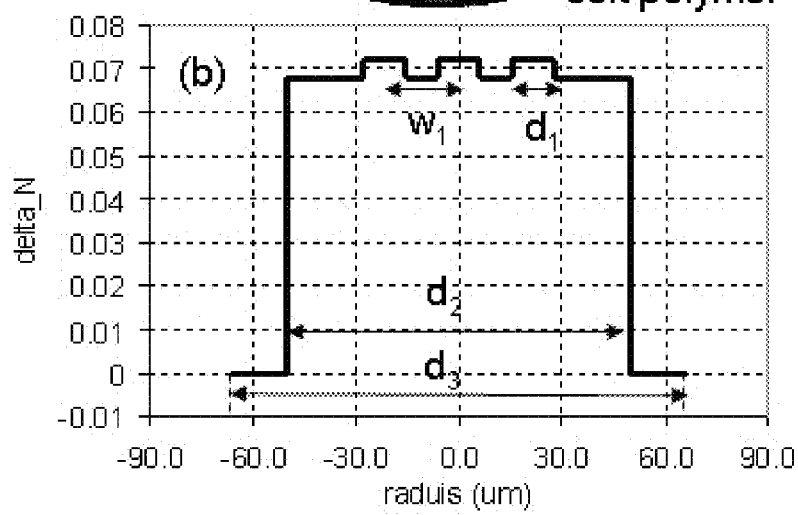
FIG. 1B is a diagram showing an index profile of the DC-MC-EDF of FIG. 1A.

FIG. 1B is a diagram showing an index profile of the DC-MC-EDF of FIG. 1A. For some embodiments, multi-mode (MM) pump light is guided by the inner cladding 110, while for other embodiments MM pump light may also be guided by the core(s) 105. Signal light, which is usually single-mode, is guided by each core 105. The light from one or more MM pumping sources is transmitted along the inner cladding 110 of the fiber. As the pump light crosses or overlaps with each core 105, it is absorbed by the rare-earth dopant, and a significant portion of stimulated emission is generated in each core 105, thereby resulting in amplification gain of the signals in each of the respective cores 105.

As an option, the inner cladding 110 may be configured in a non-circular, irregular shape (e.g., star shape as shown in FIG. 1A) to increase interaction of pump light with the signals in each of their respective cores 105, thus improving pump light absorption. In this scheme, the active gain of signals in each core will be generated by common pump light, and DC pumping also allows the use of low cost MM pumps. As such, significant energy savings are achieved, as compared to conventional single-core core-pumped EDFA schemes.

Figures 2A, 2B:
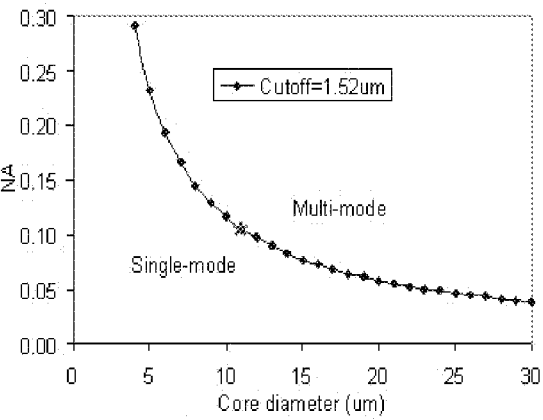
FIG. 2A shows a table of example parameters for one embodiment of a DC-MC-EDF.
FIG. 2B shows the single-mode operation regime as a function of numerical aperture and core diameter for the DC-MC-EDF of FIG. 2A.

FIG. 2A shows a table of example parameters for one embodiment of a DC-MC-EDF. In other words, some key fiber parameters of a DC-MC-EDF with a simple step-index design are shown in the table of FIG. 2A. As shown in FIG. 2A, an inner cladding with a diameter of about 100 microns allows for high-power-efficiency while matching commercially-available multimode (MM) diode pigtail fibers (105/125 microns, NA=0.15). A relatively large signal core diameter (about 12 microns) helps to increase pump absorption, while keeping fiber operation conditions in fundamental mode (single-mode). This is achieved by choosing a core refractive-index and core diameter to satisfy the single-mode fiber criterion, $\pi \times NA1 \times d1/\lambda < Vc$, where $\lambda$ is the operating wavelength, NA1 is the numerical aperture of the core 105 (FIG. 1A) with reference to the inner cladding, d1 the diameter of the core 105 (FIG. 1A), Vc is the cutoff frequency (Vc=2.405 for step index fiber).

One of the key issues seems to be maximizing the area of Er-doping, which is typically achieved by maximizing the core diameter, while retaining single-mode operation and keeping crosstalk low. In designing the DC-MC-EDF, one should consider the impact of bending on the effective cutoff of the fiber. Since the fiber is typically coiled or wound on a spool, bending of the fiber will push the cutoff to lower wavelengths, providing more efficient stripping of higher modes than observed with lower bend diameters. Such bending may make otherwise few-moded fibers practical. Hence, stripping of higher modes while retaining large core area and low cutoff can be accomplished by encircling the cores with refractive index trenches.

FIG. 2B is a diagram showing the single-mode operation regime as a function of a numerical aperture and core diameter for the DC-MC-EDF of FIG. 2A. Specifically, FIG. 2B shows the NA1 as a function of core diameter d1 for cutoff wavelength of 1520 nm which is adequate for conventional telecommunication applications. The single-mode operation can also be achieved by carefully launching the signal light to preferentially excite only the fundamental mode. In addition, core designs with greater complexity can be used to increase the core area while maintaining single-mode operation. These include use of low-index trenches and/or high-index rings to suppress higher order modes. For some embodiments, the trench permits maximization of the doped area while still retaining good bend-loss characteristics and single-mode operation. These advantageous characteristics are described in greater detail in U.S. Provisional patent application Ser. No. 13/621,376, by Taunay, et al., having the title "Double-clad, Gain-Producing Fibers with Increased Cladding Absorption while Maintaining Single Mode Operation," filed Aug. 29, 2012, which is incorporated herein by reference as if expressly set forth in its entirety.

With such designs of MC-EDF with Er peak absorption of 30 dB/m, the area ratio of A(cladding):A(core) is from about 65:1 to about 70:1. This results in a cladding absorption coefficient of from about 0.4 to about 0.5 dB/m. Assuming a 90% pump absorption, these absorption coefficients are sufficiently high to construct efficient amplifiers (e.g., gain >20 dB) with a length of about 50 meters. Note that this fiber length is relatively long compared to conventional core-pumped amplifiers despite the fact that the Er concentration is higher than that used in typical amplifiers and is expected to result in measurable impairment in optical efficiency. These points illustrate that design of a MC-EDF requires difficult tradeoffs.

Lower area ratios, such as about A(cladding):A(core)=50:1, would enable even shorter fiber lengths. As the length of DC-MC-EDF for the DC-MC-EDFA will be relative short (in the range of tens-of-meters), compared to the transmission distances from about 100 kilometers (km) to tens-of-thousands-of-kilometers, it is expected that the core-pitch around 22 microns to around 25 microns will make crosstalk among cores sufficiently low, thereby largely avoiding transmission penalty at the operation wavelengths. This allows for reduction of the inner cladding diameter, further reducing fiber length. Furthermore, this has the advantage of increasing pump intensity, which is an important factor in minimizing noise.

In addition to achieving sufficiently high pump absorption in DC-MC-EDF, another issue is whether sufficiently high pump intensity can be achieved to produce a population inversion level for high gain and low noise across the entire usable gain band of the active regions. For Erbium (Er), the threshold pump intensity for a 50% population inversion is given by $I_{th}=hv/\sigma\tau$, which is approximately 10 kilowatts (kW) per square centimeter ($cm^2$), where hv is the photon energy, $\sigma=2\times 10^{-21}$ $cm^2$ at 980 nm is the absorption cross-section and $\tau$ (approximately 10 milliseconds (ms)) is the upper state lifetime.

With an inner-cladding diameter of about 100 microns, this results in a pump power of about 785 milliwatts (mW) at a pump wavelength of 980 nm for a DC-MC-EDF to obtain the 50% population inversion. In order to achieve high gain and low noise performance in the amplifier, a population inversion of greater than about 75% is usually desirable, which corresponds to a pump intensity that is approximately three to four times Ith, or approximately 40 $kW/cm^2$. This corresponds to a local pump power of about 3 Watts (W) for a DC-MC-EDF with a cladding diameter about 100 microns.

Since, in an efficient amplifier, the fiber should be sufficiently long to allow almost complete pump light absorption, the local pump intensity roughly decreases exponentially as a function of position for a co-pumped amplifier, causing a decrease in the local population inversion with distance from the front end of the amplifier. Also, another consideration for pump power is the depletion which may occur due to absorptions in other cores within the MC-EDF. With those factors, the pump power tends to be larger by a factor of about double or triple the value calculated above. So, a total power of 6 W to 9 W will be desirable to construct a DC seven-core EDFA with a gain that is greater than 25 dB.

Currently, low cost 980 nm multimode diodes with output power of more than 10 W are commercially available. To reduce the variation of pump intensity along the fiber length, the amplifier may be bi-directionally pumped, as shown below in FIG. 7, below. For some embodiments, the DC-MC-EDF may also be counter-pumped by employing only the TC-TFC 210b on the right side of FIG. 7, below. Multistage amplifiers can also be used to improve the gain, noise, and output saturated powers. For the disclosed embodiments, a noise floor of about 5 to 7 dB would be expected and a noise floor of less than 4 dB may be difficult to achieve. However, a noise floor of about 5 to 7 dB is good enough for in-line and power-booster amplifiers in multiple amplified spans of long haul point-to-point transmission systems.

Other relevant design aspects include minimizing the inner cladding area, maximizing the pump intensity while minimizing the necessary pump power and fiber length, and maximizing the NA of the inner cladding. To accommodate these design criteria, it is preferable to have close core-spacing in the MC-EDF. Furthermore, one will appreciate that a TC-MCF (described in greater detail below) may better accommodate these design criteria than a side-pumped scheme (described in greater detail below).

Multicore (MC) Tapered Signal-Pump Fiber Combiner (TFC)

Figure 3:
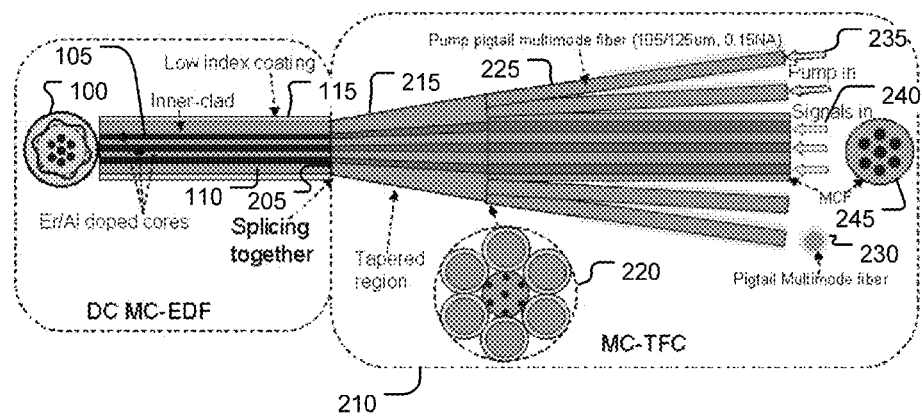
FIG. 3 is a diagram showing one embodiment of a MC tapered signal-pump fiber combiner (TFC) that is spliced onto a DC-MC-EDF.

FIG. 3 is a diagram showing one embodiment of a MC tapered signal-pump fiber combiner (TFC) that is spliced onto a DC-MC-EDF. One of the technical difficulties in designing MC optical amplifiers is the coupling of pump light to the active medium in each core with high efficiency (low optical loss) and high power intensity sufficient to produce a reasonable gain with low noise figure. The embodiment of FIG. 3 seeks to solve this technical difficulty by using a MC-TFC 210 to efficiently couple pump light 235 into an inner-cladding area of DC-MC-EDF 100.

The embodiment of FIG. 3 comprises a MCF 245 surrounding by a ring of pump pigtail MM fibers 225. These pump pigtail MM fibers 225 are compactly bundled together, as shown in the bundle cross-section 220. The bundled MM fibers and MCF are then fused and tapered to achieve matching of the core-pitch and core mode-field diameters (MFD) to the DC-MC-EDF 100. The tapered bundle is cleaved and spliced 205 onto the DC-MC-EDF 100. The tapered region 215 and the splicing area can be (optional) over-coated with a low index material such as a low index polymer coating. The optical signals 240 are coupled to the DC-MC-EDF 100 through the central MCF 245, and the pump light 235 is coupled into the inner cladding area 110 of DC-MC-EDF 100 through the pump pigtail MM fibers 225.

In the specific example of FIG. 3, the MCF 245 at center of MC-TFC 210 comprises seven cores which are arranged in a hexagonal array, though other numbers of cores and geometries are possible. In order to achieve low loss core-matched connections at the spliced ends, the core-pitch and mode-field diameter (MFD) at the tapered end of the MC-TFC 210 are matched with those of the DC-MC-EDF 100. The core-pitch and MFD at the un-tapered end is matched with that of another fiber span, or matched with that of another multicore component (e.g., MC isolators, MC gain-flatten filters, etc.), which may be spliced together or may be coupled using free-space optics. In other examples, MCF 245 can comprise a bundle of discrete fibers, each containing a single core carrying an optical signal 240.

Figure 4:
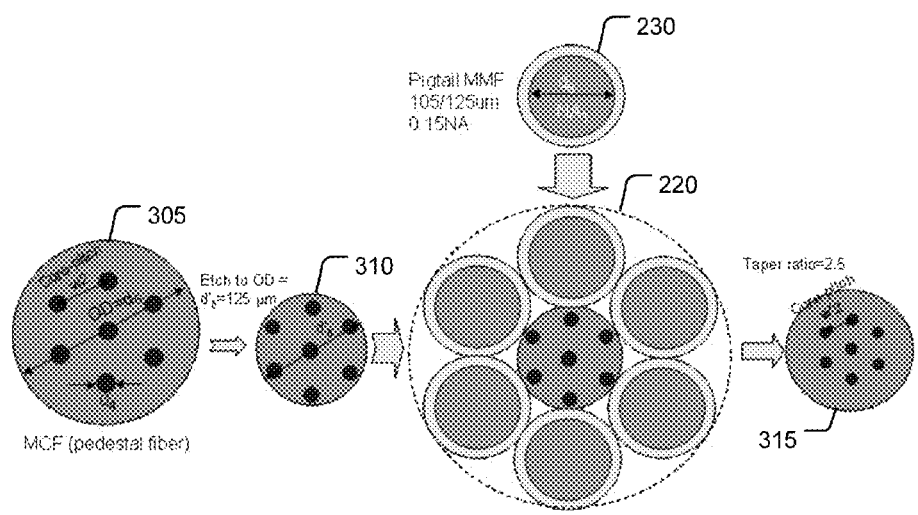
FIG. 4 is a diagram showing various cross-sections of one embodiment of a MC-TFC during its fabrication process.

FIG. 4 is a diagram showing various cross-sections of one embodiment of a MC-TFC 210 during its fabrication process. As shown in FIG. 4, a single strand of MCF 305, which can be made of seven-core pedestal fiber with core diameter of d4, core pitch of w2 and outer-cladding diameter of d5, is first etched on its end segment to generate an etched fiber 310, with a reduced cladding diameter (from d5 to d5') without affecting the core and MFD of each core, where:

$$d5' \geq 2 \times w2 + d4.$$

This reduction of cladding is done, if necessary, in order to achieve the pitch-matching for making MC-TFC.

As shown in the embodiment of FIG. 4, six multimode fibers are arranged around a single seven-core fiber, which has been etched so that its cladding diameter has been reduced from d5 to d5'. A ring of MMFs (cross section 230 shown), each with a core diameter of d6 (e.g. 105 um) and a numerical aperture of NA3 (e.g 0.15), are laterally arranged around the etched end segment of the MCF to create a bundle (cross section 220) (in this case d6=d5'). The bundle is then fused together at high temperature, and then subsequently tapered to achieve the tapered cross-section 315. The processes of fusing and tapering can be accomplished by clamping the bundle, applying heat, such as with a gas burner (with a flame to heat the bundle to around 1000 degrees Celsius) below the bundle, and pulling on each end. To uniformly apply heat, the bundle may be rotated during the fusing and tapering process. In order to avoid excessive losses for both the signal (in each core) and the pump (in the inner cladding), the taper-down-ratio in this step can be pre-determined as follows:

First, the core-pitch w2' at tapered end of MC-TFC 210 is set so that it will equal the core-pitch w1 in DC-MC-EDF 100. Next, the mode-field diameter (MFD) of each core at the tapered end is set so that it approximately matches the MFD of each core 105 in DC-MC-EDF 100. Exact matching is not necessary if the fibers are spliced and well-known splice optimization methods are used to reduce coupling loss. Thereafter, the diameter at the tapered end of MC-TFC is closely matched to the diameter of inner cladding 110 of DC-MC-EDF 100, preferentially maintaining the following, approximate target condition:

$$M(\pi d_6^2) NA_3 \leq (\pi d_2^2) NA_{inner-clad}$$

where the $NA_{inner-clad}$ is the numerical aperture of the inner-cladding of DC-MC-EDF 100, and M is the number of pump pigtail MM fibers 225. This condition is preferred in order to obtain high multimode throughput (i.e., low insertion loss of pump light) in MC-TFC.

After tapering, the end section of the fused bundle is carefully cleaved to provide a clean and smooth end. This smoothed end can then be core-matched spliced onto the DC-MC-EDF 100. In order to do this, the end of MC-TFC 210 is butt-coupled to the end of DC-MC-EDF 100, which can be done on a commercially-available fusion splicer. The resulting fusion splice is achieved by optimizing the aggregate alignment of the cores of MC-TFC 210 with the cores 105 in DC-MC-EDF 100. Thereafter, a high temperature heat source, such as for example a plasma arc, is applied to the splice region while the cores of the MC-TFC 210 and the cores 105 of the DC-MC-EDF 100 are held in proper alignment. The final MC-TFC 210 spliced with DC-MC-EDF 100 is schematically depicted in FIG. 3. Again, well-known splice-optimization methods may be used to improve the splice loss through slight modification of core MFD.

As an example, the seven-core fiber for MC-TFC 210 has a core diameter (d4) of 10 microns, a core-pitch (w2) of 54 microns, and an outer diameter (d5) of 200 microns. The cutoff wavelength of this seven-core fiber is about 1500 nm. After the outer diameter (OD) of the seven-core fiber is etched to d5', which is about 125 microns, it is surrounded by six MMF, each having a core diameter of about 105 microns, an OD of about 125 microns, and a numerical aperture (NA) of about 0.15. It should be appreciated that the etching step may be omitted if the MC-TFC 210 is designed with an outer diameter d5 to match that of the MMF.

The bundle is then tapered down to a ratio of about 1:2.5, thereby resulting in a core-pitch of w2' at the tapered end of MC-TFC 210, which matches w1 of FIG. 1A at about 22 microns. By tapering the fiber, the index profile of the fiber may be changed due to thermal diffusion, and the core diameter is reduced through physical tapering. As a result, the mode-field properties as well as core diameter and core-pitches of the MCF are usually changed. Either MFD mismatching or core-pitch mismatching often result in high splice losses. So the design criteria here are (1) the matching of both MDF and core-pitch between DC-MC-EDF and, (2) the tapered end of MCF-TFC 210, in order to reduce the splice losses. In other words, the MFD should remain substantially unchanged by the tapering. To ensure that the MFD remains substantially unchanged, a specialized design of fiber can be used to control the MFD. One example of controlling the MFD is to employ a pedestal fiber, which is described in greater detail with reference to FIGS. 5A and 5B.

Figures 5A, 5B:
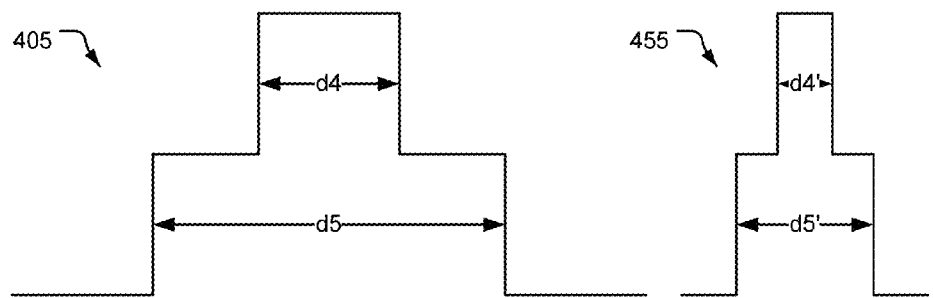
FIG. 5A is a diagram showing a refractive index profile of one embodiment of a pedestal fiber before tapering.
FIG. 5B is a diagram showing a refractive index profile of pedestal fiber of FIG. 5A after tapering.

FIG. 5A is a diagram showing a refractive index profile of one embodiment of a pedestal fiber before tapering, and FIG. 5B is a diagram showing a refractive index profile of pedestal fiber of FIG. 5A after tapering. From the description of the embodiment of FIG. 3, one can see that the core spacing in the DC-MC-EDF 100 could be (and sometimes should be) smaller than the core spacing in the transmission fiber to which the DC-MC-EDF 100 is coupled. While this provides smaller cladding area, it is nevertheless allowable because signal crosstalk will be kept within a manageable range by the relatively short length of the DC-MC-EDF compared to the transmission fiber.

By tapering the fiber (as shown in FIGS. 5A and 5B), the index profile of the fiber may be changed (from 405 to 455) due to thermal diffusion, while the core diameter is reduced (from d4 to d4') through physical tapering. As a result, the mode-field properties as well as core diameter and core-pitches of the MCF are changed, possibly causing mode-field mismatching and high splice-loss at the point of splicing. Hence, a specially designed refractive index profile such as "pedestal fiber" is used to match the MFD at the points of connections to the taper fiber. One having skill in the art will appreciate that it may be possible to design the core in the MC-TFC so that MFD matches without the need to employ a pedestal. Thus, the use of a pedestal is just one embodiment, among others.

In an embodiment of the present invention, a pedestal fiber has a core d4 that is usually surrounded by a lower index pedestal d5. Thus, the light is guided by the core d4, with the pedestal d5 acting as the cladding when the fiber is un-tapered 405. When the fiber is tapered 455, the core d4' of the fiber becomes too small to confine the mode, and the light becomes mainly guided by the pedestal region d5'.

Figure 6:
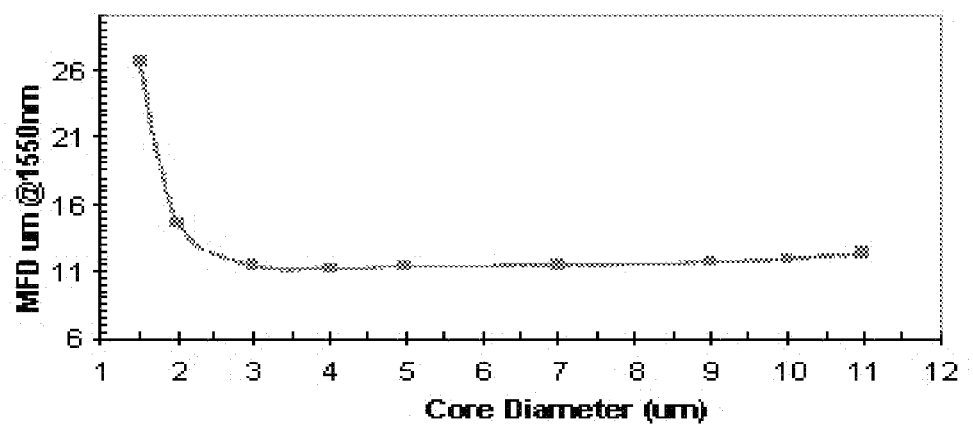
FIG. 6 is a diagram showing a simulation result of a mode-field diameter (MFD) as a function of core diameter using the pedestal fiber of FIG. 5B.

FIG. 6 is a diagram showing a simulation result of a mode-field diameter (MFD) as a function of core diameter using the pedestal fiber of FIGS. 5A and 5B. As shown in FIG. 6, the MFD is virtually un-changed when a core diameter of such fiber is tapered down from 11 microns to 3 microns. In the MC-TFC 210, both the MFD and core-pitch after tapering are matched with that of DC-MC-EDF. Thus, low loss can be achieved when the MC-TFC 210 is core-match-spliced to the DC-MC-EDF 100. However, the MFD of the untapered cores of the MC-TFC 210 may be designed to be different from those of DC-MC-EDF 100, for example, to better match the MFD of MCF. In such a case, the index profile of the cores of the MC-TFC 210 should be designed accordingly to meet the criterion of low splice loss between the tapered end of MC-TFC 210 and DC-MC-EDF 100.

Figure 7:
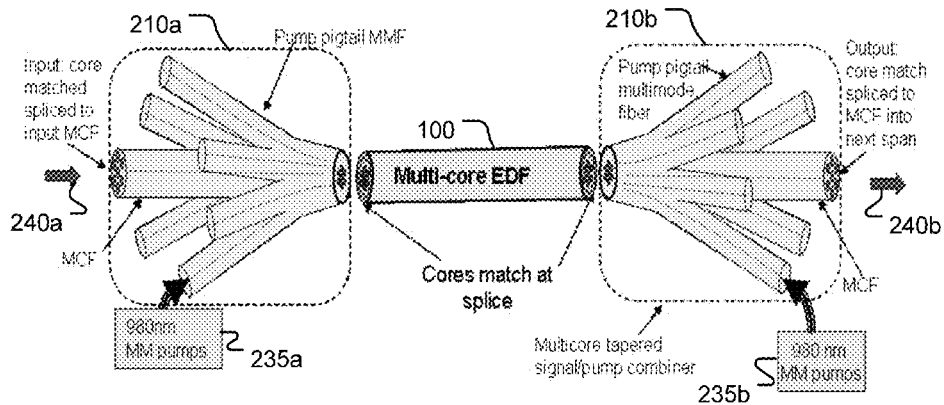
FIG. 7 is a diagram showing one embodiment of a DC-MC-EDF Amplifier (EDFA).
Figure 10:
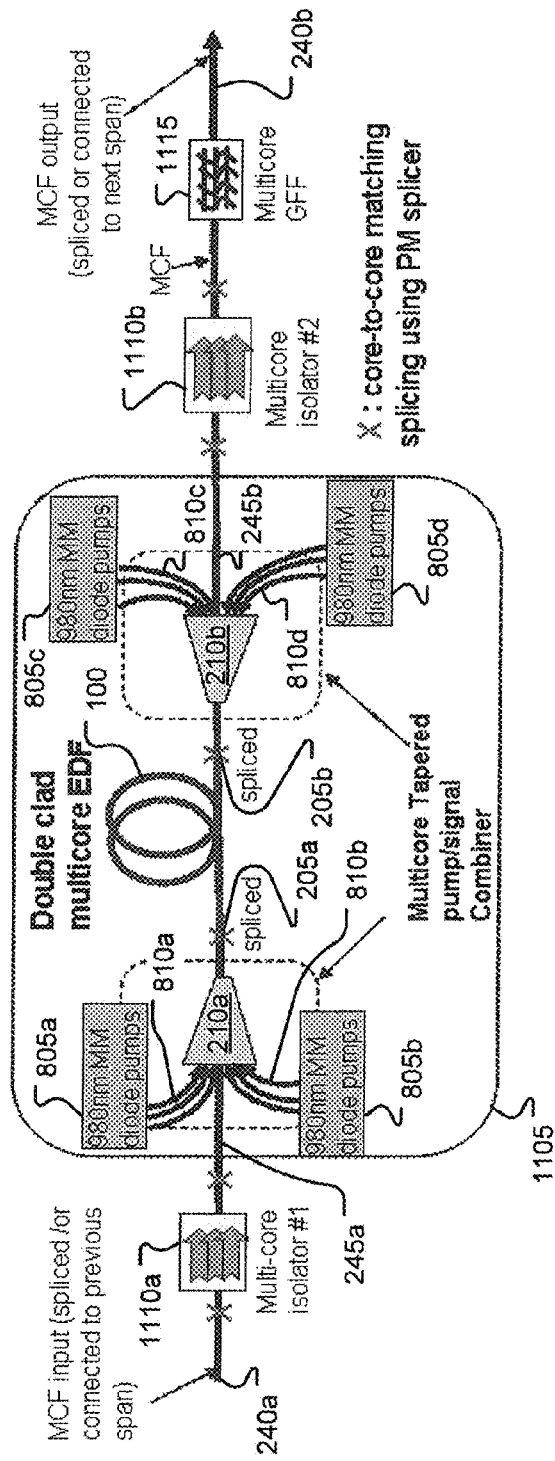
FIG. 10 is a diagram showing one embodiment of a system employing a DC-MC-EDFA.

The surrounding fibers are multimode fibers (MMF), each capable of coupling light from a MM light source into the inner cladding 110 of DC-MC-EDF 100. These may be similar to or, the same as, MM diode's pigtail fibers, and typically have pure silica cores surrounded by lower index fluorine (F) doped cladding. At this point, it should be noted that, while FIGS. 4, 7, and 10 show multiple pump ports, the amplifier can be powered by a single pump as long as the pump has sufficient pump intensity. Since the design goal is to maximize pump intensity, for some embodiments it may be preferable to reduce the number of pump ports. Irrespective of the number of pump ports used to power the amplifier, it should be noted that the pitch and the mode-field should be matched at the splice between the cores of the MC-EDF and the cores of the MC-TFC.

Double-Cladding (DC) Pumped Multicore (MC) Erbium-Doped Fiber Amplifier (EDFA)

FIG. 7 is a diagram showing one embodiment of a DC-MC-EDFA. As shown in the embodiment of FIG. 7, the cores share a pump source of commercially-available MM pumps 235a, 235b (collectively, 235). For some embodiments, these pump MM pumps 235 operate at 980 nm. Er amplifiers may also be pumped round 1480 nm, or indeed at any wavelength in which Er has a resonant absorption band.

The DC-MC-EDFA comprises a length of DC-MC-EDF 100, which is core-matched at the splice to one (or two) MC-TFC 210a, 210b (collectively 210). The MC-TFC 210 has one multicore "passive" fiber 245 at its center, which is combined with one or more pump pigtail MM fibers (as shown in FIG. 3). The pump can be provided by a co-propagation scheme, a counter-propagation pumped scheme, or both co- and counter-propagation schemes. The DC-MC-EDF 100 and MC-TFC 210 can be core-matched spliced together by aligning the cores using, for example, a polarization-maintaining (PM) fiber splicer, or some other method which allows observation of the individual cores or a marker which indicates core position. The input and output of the DC-MC-EDFA can be core-matched spliced (or connected) to the MCF 245 or to other multicore optical components such as multicore isolators, and MC gain flatten filters (GFF) (as shown in FIG. 10), which may be necessary for MC-EDFA.

One advantage of the embodiment of FIG. 7 is that the input and output signals in each core in the DC-MC-EDFA need not be separated to be interfaced with each core in MCF 245. Another advantage of the embodiment of FIG. 7 is that the DC-MC-EDF shares common pump power, thereby providing a lower-cost, more energy-efficient approach.

Also, in the DC-amplifier fiber, the length depends on the doped area, not on the core area, so it is possible to extend doping into the cladding region. This should be done judiciously, namely, the dopant should not extend into regions where the signal intensity is too low. Should this occur, high amplified spontaneous emission (ASE) and inefficient gain extraction may result. Also, since the cladding region has lower co-dopant concentrations, the cladding region will be more prone to the detrimental effects, such as concentration quenching or pair-induced quenching. Therefore, cladding concentration of Erbium (Er) may be lower than that within the more-highly doped core regions.

Specifically, by considering and trading-off the effects of concentration, dopant type, and waveguide properties on performance, the embodiments of FIGS. 1A, 1B, 3, 4, and 7 show Ytterbium (Yb) free DC-MC-EDFs that have improved core peak absorptions by judiciously increasing the Er-concentration. This results in sufficient absorption for a DC-pumping scheme, while keeping effects such as concentration quenching and excited state absorption (ESA) reasonable small. Peak core absorption can be used as a measure of the local Er ion concentration and is preferably greater than 5 decibels (dB) per meter (m) at 1530 nanometers (nm), and more preferably greater than 10 dB/m. In some instances, depending on the ratio of doped are to inner cladding area (as discussed below), it may be preferable to have as much as 25 dB/m peak absorption, but it is preferably less than 50 dB/m.

Double-Cladding (DC) Side-Pumping (SP) Scheme

Figure 8:
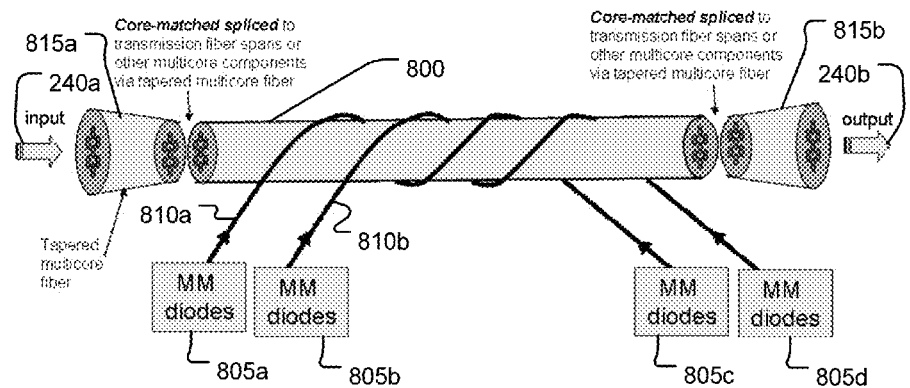
FIG. 8 is a diagram showing one embodiment of a DC side-pumping (SP) scheme.

FIG. 8 is a diagram showing one embodiment of a DC side-pumping (SP) scheme, where one pump optical fiber 810a or two pump optical fibers 810a, 810b (collectively 810) contact a DC-MC-EDF 800. Thus, the pump optical fibers 810 and DC-MC-EDF 800 are optically contacted together over at least a portion of their lengths, forming a common outer-cladding.

The DC-SP scheme further improves pump light efficiency because the optical contact between the pump fibers 810 and the DC-MC-EDF 800 allows the light propagating in the near surface region in the pump fibers 810 to penetrate into each core in the DC-MC-EDF 800. Because the fibers 800, 810 have a common outer-cladding layer, the multimode pump light from MM diodes 805a, 805b, 805c, 805d (collectively 805) will couple into the inner-cladding of MC-EDF 800.

For some embodiments, it is clear that the core spacing in the DC-MC-EDF 800 should be smaller than the core spacing in the transmission fibers to which the DC-MC-EDF 800 is coupled. While this provides a smaller cladding area, it is nevertheless permitted because signal crosstalk is kept within a manageable range by the relatively short length of the DC-MC-EDF 800, as compared to a relatively lengthy transmission fiber.

In order to make a core-matched connection with the transmission fiber or with other optical components, a tapered-MCF 815a, 815b (collectively 815) is used, if necessary, at the input and/or output of the DC-SP-MC-EDFA. A pedestal fiber, as discussed above, may be used in such a design of tapered-MCF 815. Also, the MFD and core-spacing of the tapered-MCF 815 should be matched with the MFD and core-spacing of the DC-MC-EDF 800 at one end, and with the MFD and core-spacing of the transmission fiber at the other end, thereby allowing optical signals 240a, 240b (collectively 240) to be coupled into and out of each core of DC-MC-EDF 800. The optical signal gain is generated in each core. The pump light from the MM diodes 805 can be coupled into the inner-cladding of DC-MC-EDF 800 through the pump fibers 810. The DC-SP-MC-EDFA can be configured in co-propagation pumped schemes, counter-propagation pumped schemes, or both.

Figures 9A, 9B:
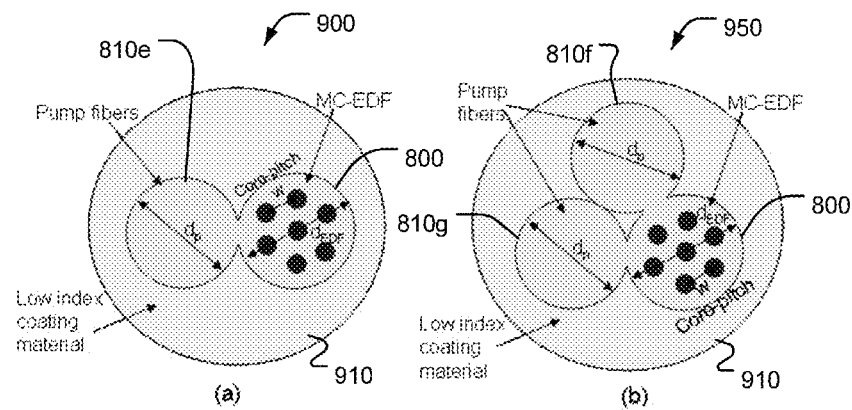
FIG. 9A is a diagram showing one embodiment of a MC-EDF in optical contact with one pump fiber.
FIG. 9B is a diagram showing one embodiment of a MC-EDF in optical contact with two pump fibers.

FIG. 9A is a diagram showing a cross-section of one embodiment of a SP-DC-MC-EDF 900, where the DC-MC-EDF 800 is in optical contact with one pump fiber 810e. FIG. 9B is a diagram showing a cross-section of one embodiment of a SP-MC-EDF 950, where the DC-MC-EDF 800 is in optical contact with two pump fibers 810f, 810g. The cross-section of the DC-MC-EDF 800 shows the DC-MC-EDF 800 having a number of cores arranged in a hexagonal array. The DC-MC-EDF 800 and the pump fibers 810 are surrounded by a low-index coating material 910 to form a common outer-cladding, as shown in FIGS. 9A and 9B. The coating material can be a soft polymer which has a refractive index less than the refractive index of the inner-cladding material.

One example of the design is that the pump fibers 810 have core diameter (dp) of 105 microns and a NA which are compatible with commercially available pigtail fibers in MM diodes. The MC-EDF 800 has a core diameter of about 12 to 15 microns and a core-pitch of about 25 to 30 microns. These cores are co-doped with at least Erbium (Er) and Aluminum (Al), have a peak absorption of about 30 to 35 dB/m, and have an inner-cladding diameter $d_{EDF}$ of about 105 microns. The NA between core and inner-cladding in the MC-EDF 800 is around 0.08 to around 0.17. The NA between the inner-cladding and the outer-cladding (which may be low index polymer or silicone resin) will be in range from about 0.18 and about 0.47, dependent on the coating materials and chosen depending on the brightness conditions of the pump light. One should appreciate that the signal can also be provided from multiple discrete single-core fibers, rather than employing a single MCF.

In this scheme, the pump absorption efficiency will be higher than the previous schemes using MC-TFC (shown above), which translates into a shorter amplifier length, if the pump intensity is higher. Alternatively, the Er concentration may be reduced at the expense of fiber length. This may occur because the side-pumped geometry enables the use of fewer pump fibers than the symmetric designs shown in FIGS. 3, 4, and 7.

The SP scheme reduces the noise of the MC-EDF 800 because the population inversion along the MC-EDF 800 is relatively higher than that in end-pumped schemes using MC-TFC (see FIGS. 3, 4, and 7). Correspondingly, the pump light efficiency will also be higher that using MC-TFC, where there are a few dummy fibers and only one or two pump diodes are actually needed.

Amplifier System

FIG. 10 is a diagram showing one embodiment of a system employing a DC-MC-EDFA 1105. The embodiment of the DC-MC-EDFA 1105 comprises a DC-MC-EDF 100, a pair of MC-TFC 210a, 210, a pair of MC fiber isolators 1110a, 1110b, and a MC gain flatten filter (GFF) 1115. These components are integrated together by core-matched-splicing. To the extent that the MC-TFC 210 and the DC-MC-EDF 100 are described in great detail above, further discussion of those components is omitted with reference to FIG. 10. Additionally, since the process of core-matched-splicing is also described above, further discussion of core-matched splicing is omitted with reference to FIG. 10.

As shown in FIGS. 1 through 10, the various embodiments of the DC-MC-EDFA 1105 and the DC-MC-EDF 100 address the challenges associated with the ever-increasing demands for higher capacity in optical networks. The above-described embodiments permit space-division multiplexing (SDM) transmission using multicore (MC) fibers, and allow for SDM dense-wavelength-division multiplexing (DWDM) long haul multi-span transmissions using multicore fibers (MCF).

Although exemplary embodiments have been shown and described, it will be clear to those of ordinary skill in the art that a number of changes, modifications, or alterations to the disclosure as described may be made. Pump light may be introduced from a single pump diode source or multiple diodes, which are configured to provide some level of robustness through redundancy. For example, pumps may also be shared among different amplifiers or gain stages. Pumps may also be other laser types, such as Raman lasers or amplifiers with output at about 1480 nm or anywhere within the absorption bandwidth of the gain medium. Furthermore, signal light may be coupled into the MC-EDF through multiple individual single-core fibers rather than from a single MC fiber, with suitable changes to the design and assembly of the MC-TSC. All such changes, modifications, and alterations should therefore be seen as within the scope of the disclosure.

What is claimed is:

1. A system, comprising:
   (a) a double-clad (DC) multicore (MC) Erbium-doped fiber (EDF), comprising:
      (a1) cores arranged in a hexagonal configuration, the hexagonal configuration having a core pitch, each core comprising Erbium dopant, each core further comprising Aluminum dopant, each core having a core diameter, the core diameter being between about 10 microns and about 15 microns, each core comprising a gain-dopant, each core having a first numerical aperture:
      (a2) an inner cladding surrounding the cores, the inner cladding having an inner-cladding diameter, the inner-cladding diameter being between about 80 microns and about 110 microns, the inner cladding having a second numerical aperture, the first numerical aperture being between about 0.08 and about 0.17 relative to the inner cladding; and
      (a3) an outer cladding surrounding the inner cladding, the outer cladding comprising a soft polymer, the outer cladding having an outer-cladding diameter that is greater than the inner-cladding diameter, the second numerical aperture being between about 0.22 and about 0.65 relative to the outer cladding;
   (b) a MC tapered signal-pump fiber combiner (TFC) optically coupled to the DC-MC-EDF, the MC-TFC comprising:
      (b1) a multicore fiber (MCF) extending from an un-tapered end of the MC- TFC, the MCF comprising pedestal fibers; and
      (b2) a MC tapered end that is core-match-spliced to the DC-MC-EDF;
      (b3) multimode fibers (MMF) surrounding the MCF, the MCF and MMF being bounded together and fused and tapered down; and
   (c) a pump optically coupled to the MC-TFC.

2. A system, comprising:
   a multicore (MC) gain-doped fiber; and
   a MC tapered signal-pump fiber combiner (TFC) optically coupled to the MC gain-doped fiber, the MC-TFC comprising:
      a MC tapered end that is core-match spliced to the MC gain-doped fiber; and
      a multicore fiber (MCF) extending from an un-tapered end of the MC-TFC.

3. A system, comprising:
   a multicore (MC) Erbium-doped fiber (EDF); and
   a MC tapered signal-pump fiber combiner (TFC) optically coupled to the MC-EDF, the MC-TFC comprising:
      a MC tapered end that is core-match spliced to the MC-EDF; and
      a multicore fiber (MCF) extending from an un-tapered end of the MC-TFC.

4. The system of claim 3, the MC-EDF having a core diameter of approximately twelve (12) microns.

5. The system of claim 3, the MC-TFC configured to co-pump the MC-EDF.

6. The system of claim 3, the MC-TFC configured to counter-pump the MC-EDF.

7. The system of claim 3, the MC-EDF being double-cladding (DC) pumped.

8. The system of claim 3, the MC-EDF comprising cores, the cores being arranged in a hexagonal array.

9. The system of claim 8, each core having a core diameter of between approximately 10 microns and approximately 15 microns, each core having a numerical aperture of between approximately 0.08 and approximately 0.17 relative to an inner cladding.

10. The system of claim 8, each core for operating in a single-mode operation.

11. The system of claim 8, each core having a peak absorption between approximately 15 dB/m and approximately 45 dB/m.

12. The system of claim 8, each core being Erbium (Er) doped, each core further being Aluminum (Al) doped.

13. The system of claim 3, the MC-EDF comprising an inner cladding.

14. The system of claim 13, the inner cladding having an inner-cladding diameter between approximately 80 microns and approximately 110 microns, the inner cladding further having a numerical aperture between approximately 0.22 and approximately 0.65 relative to an outer cladding.

15. The system of claim 13, further comprising an outer cladding surrounding the inner cladding.

16. The system of claim 15, the outer cladding being a soft polymer.

17. The system of claim 15, the outer cladding being an air cladding.

18. The system of claim 3, the MCF and MMF being fused and tapered down.

19. The system of claim 3, the MCF comprising cores, each core being a tapered-down pedestal fiber.

20. The system of claim 3, further comprising a pump optically coupled to the MC-TFC.

\* \* \* \* \*